United States Patent [19]

Jackson, Jr. et al.

[11] Patent Number: 4,604,449
[45] Date of Patent: Aug. 5, 1986

[54] PROCESS FOR PREPARING POLY(ESTER-AMIDES)

[75] Inventors: Winston J. Jackson, Jr.; Herbert F. Kuhfuss, both of Kingsport, Tenn.

[73] Assignee: Eastman Kodak Company, Rochester, N.Y.

[21] Appl. No.: 785,647

[22] Filed: Oct. 9, 1985

[51] Int. Cl.[4] .................. C08G 63/44; C08G 69/44
[52] U.S. Cl. ...................................... 528/288; 525/437
[58] Field of Search ....................... 528/288; 525/437

[56] References Cited

U.S. PATENT DOCUMENTS 4,254,254  3/1981  Gilkey et al. .................. 528/288
4,328,331  5/1982  Chen et al. .................... 528/288
4,380,622  4/1983  Chiba et al. ................... 528/288

*Primary Examiner*—Lucille M. Phynes
*Attorney, Agent, or Firm*—John F. Stevens; William P. Heath, Jr.

[57] ABSTRACT

Disclosed is a process for preparing poly(ester-amides) by aminolysis of polyesters and glycol esters with diamines or aminoalcohols and then polycondensation. This process is thus useful in the production of poly(ester-amides) which find application in the production of fibers, films, sheets, molded objects, and other products.

4 Claims, No Drawings

PROCESS FOR PREPARING POLY(ESTER-AMIDES)

DESCRIPTION

1. Technical Field

This invention relates to a process for preparing poly(ester-amides) by aminolysis of polyesters and glycol esters with diamines or aminoalcohols and then polycondensation. This process is thus useful in the production of poly(ester-amides) which find application in the production of fibers, films, sheets, molded objects, and other products.

2. Background of the Invention

Poly(ester-amides) prepared by conventional melt techniques of ester interchange of a glycol and diamine with a dialkyl ester of a dicarboxylic acid are generally low molecular weight and are highly colored. It is very surprising that high inherent viscosity, tough, clear, light yellow polymers can be prepared using an aminolysis process. Poly(ester-amides) can also be prepared using a dicarboxylic acid instead of the dialkyl ester of a dicarboxylic acid, but since the amine-acid reaction proceeds at elevated temperatures at a much higher rate than does glycol-ester interchange, a heterogeneous polymer composition is obtained. In many cases, particularly with aromatic acids, a low molecular weight product is obtained because of solidification caused by high-melting polyamide blocks. Poly(ester-amides) prepared using our new aminolysis process are high molecular weight, tough polymers.

Tough films are obtained from the polymers of this invention by pressing or by extrusion. Molding plastics having good properties are obtained by injection molding at about 240°–300° C., depending on the melting point of the poly(ester-amide). In addition to plastics, the compositions of this invention may be fabricated to give other types of shaped objects, such as foamed plastics, fibers. films extruded shapes, and coatings.

Of interest is Bull. Acad. Sci., USSR, pages 202-204 (1958) which describes the aminolysis of poly(ethylene sebacate) with 1,6-hexanediamine. No other polyesters or diamines are disclosed as reactants.

DESCRIPTION OF THE INVENTION

According to the present invention, there is provided a process for preparing linear condensation poly(ester-amides) which comprises reacting in a molten form a compound of the formula

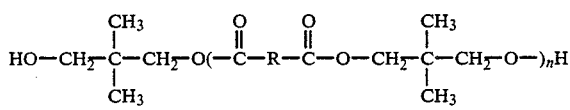

wherein n is 1–200 and R is a divalent alicyclic radical having 4 to 20 carbon atoms, a divalent aliphatic radical having 4 to 20 carbon atoms or a divalent aromatic radical having 6 to 16 carbon atoms with the carbonyl linkages separated by at least 3 carbon atoms, with (a) about 5–50 mol % of a diamine of the formula

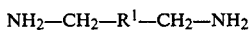

wherein R is a divalent alicyclic radical having 4 to 20 carbon atoms, a divalent aliphatic radical having 0 to 20 carbon atoms or a divalent aromatic radical having 6 to 16 carbon atoms, or (b) about 5–80 mol % of an aliphatic or cycloaliphatic amino alcohol having 4–20 carbon atoms to form a high melt viscosity polymer having an I.V. of at least 0.4. Also, the present invention provides poly(ester-amides) having an I.V. of at least 0.4 and having repeating units of

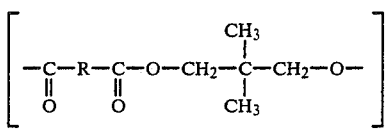

and

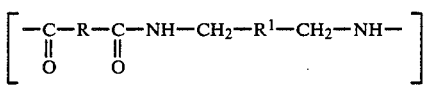

wherein R is a divalent alicyclic radical having 4 to 20 carbon atoms a divalent aliphatic radical having 4 to 20 carbon atoms, or a divalent aromatic radical having 6 to 16 carbon atoms with the carbonyl linkages separated by at least 3 carbon atoms, and $R^1$ is a divalent alicyclic radical having 4 to 20 carbon atoms, a divalent aliphatic radical having 0 to 20 carbon atoms or a divalent aromatic radical having 6 to 16 carbon atoms.

Examples of dicarboxylic acids that can be used to prepare the starting polyester or glycol ester include terephthalic, isophthalic, adipic, azelaic, suberic, pimelic, sebacic, the isomeric cyclohexanedicarboxylic acids, sulfonyldibenzoic diphenic, oxydibenzoic, methylenedibenzoic, monochloroterephthalic, dichloroterephthalic, and naphthalenedicarboxylic acids. Neopentyl glycol is used as the diol component.

The aminolysis of the polyester may be carried out with 5–50 mol % of aliphatic or cycloaliphatic diamines having 2 to 20 carbon atoms. Examples include ethylenediamine, propylenediamine, and hexamethylenediamine. Branched chain aliphatic diamines such as 3-methylhexamethylenediamine, 2-ethylhexamethylenediamine, 3-methylheptamethylenediamine, etc., also may be used. Amines containing an alicyclic nucleus can be advantageously used, as represented by 1,3-diaminocyclohexane, 1,4-diaminocyclohexane, 1,4-cyclohexanebis(methylamine), etc.

Aminolysis of the polyester can also be carried out with 5–80 mol % of aliphatic or cycloaliphatic aminoalcohols containing from 4 to 20 carbon atoms such as 4-aminomethylcyclohexanemethanol, 5-amino-1-pentanol, 5-amino-2-ethyl-1-pentanol-1, 5-amino-2,2-dimethyl-1-pentanol, etc. Aminoalcohols containing only 2 and 3 carbon atoms apparently form cyclic componds during the preparation of the poly(ester-amides).

The poly(ester-amides) of the invention are made by aminolysis of a polyester with a diamine or an aminoalcohol. In a typical laboratory preparation, the reactants are placed in a flask and evacuated and purged five times with nitrogen (to remove all traces of oxygen) before being heated at 120° C. with stirring under nitrogen. The reactants are then heated to about 200° C. (or at a temperature just below the boiling point of the diamine or aminoalcohol if its boiling point is lower than 200° C.). The temperature of the bath is then increased to about 250°–260° C. and held for 15 minutes. At this stage, a clear, low melt viscosity product is obtained because of aminolysis of the polyester. A vacuum of about 0.5 millimeter is applied so that glycol can be distilled out, and stirring is continued until a high-melt viscosity polymer is obtained. The molecular weight of a crystalline prepolymer may be increased to a high value by heating particles of the polymer in an inert atmosphere or under reduced pressure at a temperature just below the softening point of the polymer.

The compositions of this invention also may contain nucleating agents, organic fibers, pigments, glass fibers, asbestos fibers, antioxidants plasticizers, lubricants, and other additives.

The poly(ester-amides) may be prepared in the melt by carrying out aminolysis of the polyester with either the diamine or amino alcohol. A typical experimental procedure for preparing poly(neopentylene terephthalate) and then a poly(ester-amide) is given below.

97 g (0.5 mol) dimethyl terephthalate
104 g (1.0 mol) 2,2-dimethyl-1,3-propanediol
0.9 mL titanium tetraisopropoxide butanol solution The above ingredients are placed in a 500 mL flask and heated in a Wood's metal bath at 205°–220° C. with stirring under $N_2$ for 90 minutes. To remove the last traces of methanol, a partial vacuum (250 mm Hg) is then applied for 30 minutes. The product is allowed to cool and 28.6 g (0.2 mol) 4-aminomethylcyclohexanemethanol is added to the flask. The flask 90 minutes. The temperature of the bath is then is then heated at 200° C. with stirring under $N_2$ for increased to 275° C. and held for 15 minutes. A vacuum of 0.5 mm of Hg is applied for 60 minutes. A high melt viscosity, light amber, clear polymer with an I.V. of 0.76 is obtained. NMR analysis indicates that the polymer contains 36 mol % of the aminoalcohol.

Inherent viscosities (I.V.) are determined at 25° C. in 60/40 phenol/tetrachloroethane at a concentration of 0.50 g/100 mL. The melting points (Tm) and glass transition temperatures (Tg) are determined with a Perkin-Elmer DSC-2 differential scanning calorimeter. NMR spectra are determined on trifluoroaceticacid solutions of the poly(ester-amides) with a Varian A-60 spectrometer. Gel permeation chromatographic (gpc) data are obtained with a Waters, Model 200, gel permeation chromatography unit in m-cresol as a solvent at 100° C.

The polymers are dried in an oven at 80° C. overnight and injection-molded to give $2\frac{1}{2} \times \frac{3}{8} \times 1/16$-in. tensile bars and $5 \times \frac{1}{2} \times \frac{1}{8}$ in. flexure bars for testing. ASTM procedures are used for measuring the tensile strength and elongation (ASTM D 1708) and flexural modulus (ASTM D 790).

The following examples are submitted for a better understanding of the invention.

EXAMPLE 1

This example illustrates the preparation of a poly(ester-amide) from poly(neopentylene terephthalate) by modification with 20 mol % 1,6-hexanediamine. A mixture of 128.7 g (0.55 mol) of poly(neopentylene terephthalate) (I.V. 0.63) and 12.8 g (0.11 mol) of 1,6-hexanediamine is placed in a 500-ml flask equipped with a stirrer, a short distillation column and inlet for nitrogen. The flask is evacuated and purged five times with nitrogen before being lowered into a Wood's metal bath maintained at 120° C. The mixture is heated under a nitrogen atmosphere with stirring to a temperature of 190° C. A clear, light yellow, low melt viscosity product is obtained within 15 minutes. The temperature of the bath is then increased to 260° C. for 15 minutes. A vacuum of 0.5 mm of mercury is then applied over a period of 10 minutes. After stirring is continued under 0.5 mm of mercury at 260° C. for 110 minutes, a high melt viscosity, clear, light amber polymer is obtained. The polymer has an inherent viscosity of 0.64 and a glass transition temperature of 84° C. A nuclear magnetic resonance (NMR) spectrum shows that the polymer contains about 22 mol % 1,6-hexanediamine. Gel permeation chromatographic (gpc) analysis shows that the polymer has a normal molecular weight distribution (Mw/Mn 2.1, Mz/Mn 4.4) where Mn is number average molecular weight. Mw is weight average molecular weight, and Mz is "Z" average molecular weight. Injection-molded bars have the following properties: tensile strength 7200 psi, elongation 88%, flexural modulus $3.2 \times 10^5$ psi.

A broader molecular weight distribution (Mz/Mn 25, indicating branching) is obtained when the same poly(ester-amide) is prepared conventionally with terephthalic acid, neopentyl glycol, and 20 mol % 1,6-hexanediamine or when a poly(ester-amide) is prepared from poly(ethylene terephthalate) and 20 mol % 1,6-hexanediamine (Mz/Mn 86). Lower ratios of Mz/Mn are indicative of linear polymers.

EXAMPLE 2

This example illustrates the preparation of a poly(ester-amide) from poly(neopentylene terephthalate) and 40 mol % 4-aminomethylcyclohexanemethanol. A copoly(ester-amide) is prepared with 0.1 mol of poly(neopentylene terephthalate) (I.V. 0.63) and 0.04 mol of 4-aminomethylcyclolexanemethanol by the procedure of Example 1. A clear, light amber polymer is obtained. The polymer has an inherent viscosity of 0.48 and a glass transition temperature of 109° C. A film pressed from the polymer is clear and creasable. $^{13}C$ NMR analysis shows that the polymer contains 40 mol % 4-aminomethylcyclohexanemethanol. Gpc analysis shows that the polymer has a normal molecular weight distribution (Mw/Mn 2.3. Mz/Mn 4.9).

EXAMPLE 3

A poly(ester-amide) is prepared with 0.1 mol of poly(neopentylene terephthalate) (I.V. 0.63) and 0.02 mol of 1.4-cyclohexanebismethylamine by the procedure of Example 1. The polymer has an inherent viscosity of 0.42 and a glass transition temperature of 100° C.

The invention has been described in detail with particular reference to preferred embodiments thereof, but it will be understood that variations and modifications can be effected within the spirit and scope of the invention.

We claim:

1. A process for preparing poly(ester-amides) which comprises reacting in molten form a compound of the formula

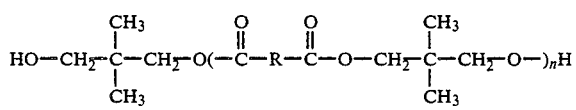

wherein n is 1–200 and R is divalent alicyclic radical having 4 to 20 carbon atoms, a divalent aliphatic radical having 4 to 20 carbon atoms or a divalent aromatic radical having 6 to 16 carbon atoms with the carbonyl linkages separated by at least 3 carbon atoms, with (a) about 5–50 mol % of a diamine of the formula

NH₂—CH₂—R¹—CH₂—NH₂ wherein R¹ is a divalent alicyclic radical having 4 to 20 carbon atoms, a divalent aliphatic radical having 0 to 20 carbon atoms or a divalent aromatic radical having 6 to 16 carbon atoms or (b) about 5-80 mol % of an aliphatic or cycloaliphatic amino alcohol having 4-20 carbon atoms to form a high melt viscosity polymer having an I.V. of at least 0.4.

2. A process according to claim 1 wherein said compound is reacted with a diamine selected from the group consisting of ethylenediamine, propylenediamine. hexamethylenediamine, 3-methylheptamethylenediamine, 1,3-diaminocyclohexane, 1,4-diaminocyclohexane, and 1,4-cyclohexanebis(methylamine).

3. A process according to claim 1 wherein said compound is reacted with an aminoalcohol selected from the group consisting of 4-amino-methylcyclohexanemethanol, 5-amino-1-pentanol, and 5-amino-2,2-di-methyl-1-pentanol.

4. A poly(ester-amide) having an I.V. of at least 0.4 and having repeating units of

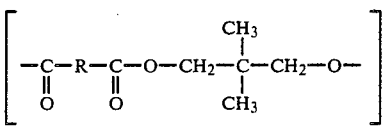

and

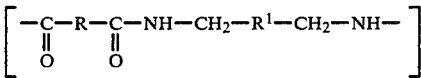

wherein R is a divalent alicyclic radical having 4 to 20 carbon atoms, a divalent aliphatic radical having 4 to 20 carbon atoms or a divalent aromatic radical having 6 to 16 carbon atoms with the carbonyl linkages separated by at least 3 carbon atoms, and R¹ is a divalent alicyclic radical having 4 to 20 carbon atoms, a divalent aliphatic radical having 0 to 20 carbon atoms or a divalent aromatic radical having 6 to 16 carbon atoms.

* * * * *